United States Patent

Vamvakas

[11] Patent Number: 4,545,908
[45] Date of Patent: Oct. 8, 1985

[54] LABEL DISPOSAL FILTER

[76] Inventor: Michael Vamvakas, 2739 Country Club Blvd., Rocky River, Ohio 44116

[21] Appl. No.: 653,285

[22] Filed: Nov. 1, 1984

Related U.S. Application Data

[63] Continuation of Ser. No. 494,904, May 16, 1983, abandoned.

[51] Int. Cl.$^4$ .................. B01D 33/06; B01D 35/16
[52] U.S. Cl. ................... 210/256; 210/257.1; 210/297; 210/326; 210/327; 210/333.01; 210/402
[58] Field of Search ............... 210/298, 354, 391, 396, 210/402, 374, 780, 784, 793, 256, 257.1, 297, 326, 327, 333.01, 393

[56] References Cited

U.S. PATENT DOCUMENTS

| | | | |
|---|---|---|---|
| 1,554,943 | 9/1925 | Antoine | 210/391 |
| 2,592,983 | 4/1952 | Hildebrandt | 210/298 |
| 3,244,281 | 4/1966 | Kurz | 210/391 |
| 4,176,067 | 11/1979 | Vamvakas | 210/402 |

*Primary Examiner*—S. Leon Bashore
*Assistant Examiner*—K. M. Hastings
*Attorney, Agent, or Firm*—Woodling, Krost, Rust & Hochberg

[57] ABSTRACT

An apparatus for separating loose paper pieces from a bath of caustic soda including a tank with a hopper-like structure disposed at the top of the tank. A helical screw conveyor is operatively disposed below the hopper and has its discharge exteriorly of the tank. A pair of perforated stainless steel screen-type spaced rotatable drums is operatively disposed between the hopper and the conveyor, and a hollow stainless steel screen-type cylindrical filter (with a nylon filter cover) is positioned in the bottom of the tank and has an outlet extending to the tank exterior. In operation, a caustic soda solution mixed with paper pieces in the hopper is discharged by gravity onto the rotating drums which feed the paper pieces via the outer (rotating) drum surfaces into the conveyor and then to the exterior of the tank. The caustic soda solution flows through the perforations in the drums and then to the bottom of the tank and through the cylindrical filter for final filtering and then to the tank exterior.

The drums and filter have back flushing devices to clean the interiors thereof. A vertical screw conveyor is operatively secured to the discharge of the helical screw conveyor for transporting the paper pieces from the helical screw conveyor up above the apparatus and onto an associated conveyor chute. Brushes are selectively positioned in the apparatus to clean the exterior surfaces of the drums and filter.

1 Claim, 2 Drawing Figures

LABEL DISPOSAL FILTER

This is a continuation of application Ser. No. 494,904, filed May 16, 1983, now abandoned.

BACKGROUND OF THE INVENTION

This invention relates to filtering machines and more particularly to an apparatus for separating loose pieces of paper from a caustic soda solution.

There has long been a need for an apparatus to cooperate with a bottle washing machine having a plurality of washing tanks, so that at the end of a washing cycle, the mixture of caustic soda and labels removed from the bottles may be passed through label disposal and caustic filter so as to remove all of the labels from the mixture and return the caustic soda substantially filtered to the washing machine tank again.

Prior machines of the above type have proved to be somewhat ineffective in their filtering ability and are most difficult to clean.

Therefore, it is an object of the invention to provide an apparatus for separating loose pieces of paper from a caustic soda solution that is highly effective in its filtering ability.

A further object of the invention is to provide an apparatus of the above type that is easy to clean.

A further object of the invention is to provide an apparatus of the above type that is simple in construction, inexpensive to manufacture, and highly effective in operation.

Briefly, the foregoing objects are accomplished by the provision of an apparatus for separating loose paper pieces from a solution of caustic soda including a tank with an elongated solid plate hopper operatively disposed at the top of the tank (interiorly thereof) for receiving a caustic solution mixed with paper pieces and having an elongated converged bottom opening defined in part by two spaced parallel bottom hopper edges positioned intermediate the top and bottom of the tank.

Pump and manifold means are provided for directing caustic solution mixed with paper pieces into the hopper. An elongated helical screw conveyor is operatively disposed below and spaced from the hopper bottom opening in parallel spaced relation thereto for feeding paper pieces to the tank exterior. Conveyor drive means is provided for driving the helical screw conveyor when desired. Also provided is a pair of coacting elongated rotatable cylindrical stainless steel screen-type perforated hollow drums which are spaced from each other to provide a space therebetween and are operatively positioned in the hopper bottom opening above and parallel to the helical screw conveyor for receiving from the hopper caustic solution mixed with paper pieces on the outer cylindrical surfaces of the drums and directing the paper pieces into the space between the drums and into the screw conveyor. The drums also receive caustic solution through the perforations in the drums and direct the solution to the bottom of the tank. Drum rotating means are provided for rotating the drums about their longitudinal axes. An elongated hollow stainless steel cylindrical screen type filter is disposed at the bottom of the tank for final filtering of the caustic solution and for directing the filtered solution to an associated storage container exteriorly of the tank.

In operation, a caustic soda solution mixed with paper pieces is fed by the pump and manifold means into the hopper and thence discharged by gravity onto the rotating drums which feed the paper pieces on the outer drum (rotary) surfaces into the conveyor and thence to the exterior of the tank. The caustic soda solution flows through the perforations in the drums and thence to the bottom of the tank and thence through the cylindrical filter for final filtering and thence to an associated storage container exteriorly of the tank.

The screen-type filter is covered with a nylon cloth to filter the caustic solution to 125 microns.

A vertical screw conveyor is operatively secured to the discharge of the elongated helical screw conveyor for transporting the paper pieces from the elongated helical screw conveyor up above the apparatus and onto an associated conveyor chute. Each of the drums has manifold piping secured to at least one of the ends thereof for feeding caustic solution from the drum interiors to the bottom of the tank. Brushes are secured to said bottom hopper edges and extend downwardly therefrom and operatively contact the drums to clean the outer surfaces of the drums and forestall clogging of the drum perforations. Also, a brush is secured to a bottom wall of the tank interiorly thereof and operatively contacts the filter to clean the exterior surface thereof. Spray flushing pipes extend axially and interiorly of each drum and of the filter for flush cleaning the same. A pressurized liquid supply means communicates with each such pipe.

Other and advantages of the invention will be apparent from the following description taken in conjunction with the drawings wherein:

BRIEF DESCRIPTION OF THE DRAWINGS

In the drawings, like numbers and letters are used to identify like and similar parts throughout the several views.

Figure 1:
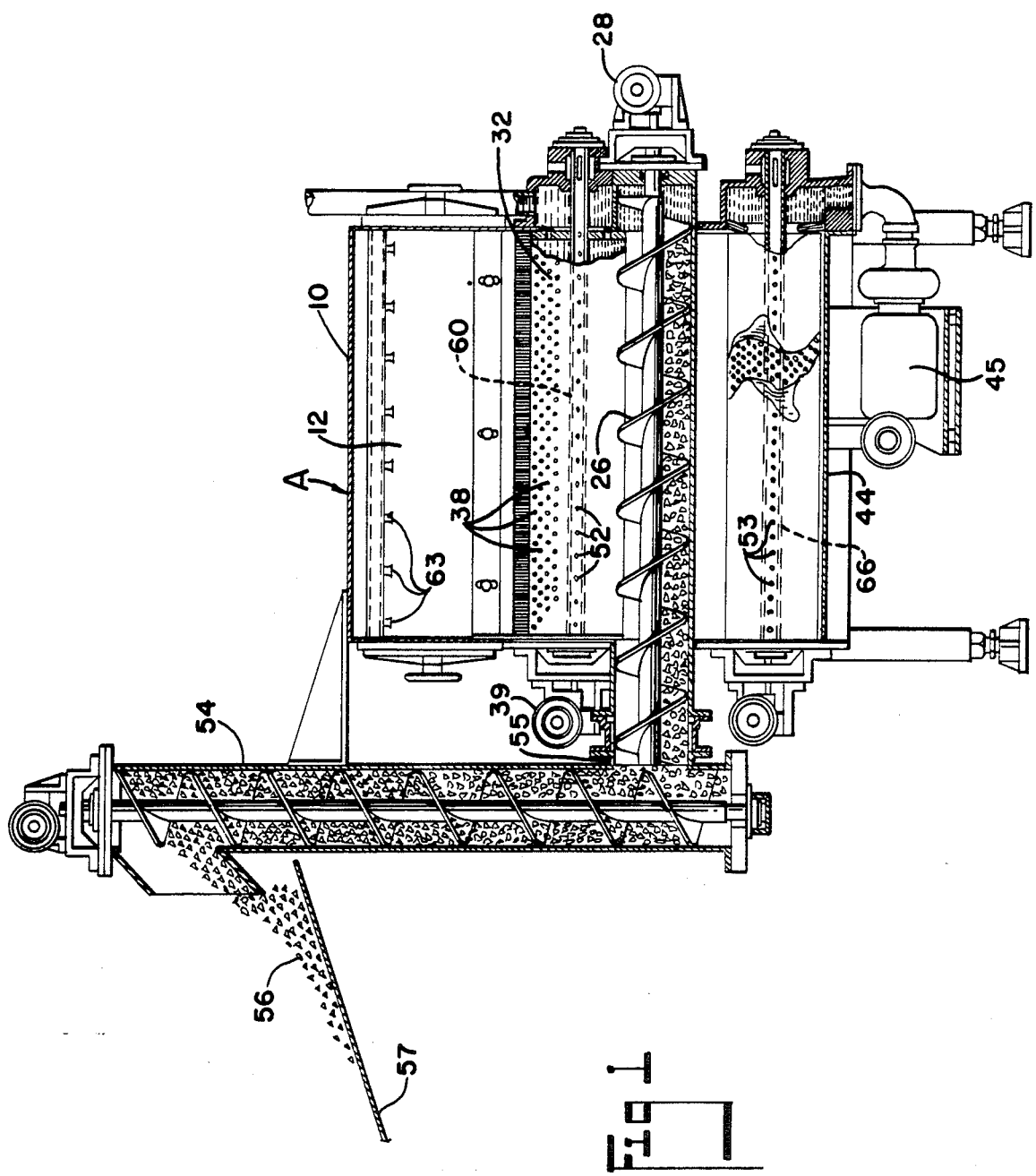
FIG. 1 is a front elevational view, partly in section, of an apparatus for separating loose paper pieces from a caustic soda solution constructed in accordance with the invention.

Referring to the drawings, there is shown an apparatus A for separating loose paper pieces from a solution of caustic soda constructed in accordance with the invention and including a tank 10, an elongated solid plate hopper 12 operatively disposed at the top of the tank 10, interiorly thereof, for receiving, from the inlet 14, a caustic solution mixed with paper pieces, and having an elongated converged bottom opening defined in part by the two spaced parallel bottom hopper edges 17 and 18 positioned intermediate the top and bottom of the tank. A pump 20 and manifold means 22 is provided for directing the caustic solution mixed with paper pieces to the inlet 14 and into the hopper. An elongated helical screw conveyor 26 is operatively disposed below and spaced from the hopper bottom opening 16 in parallel spaced relation thereto for feeding paper pieces to the tank exterior. Conveyor drive means such as the motor 28 is provided for driving the helical screw conveyor 26 when desired.

Figure 2:
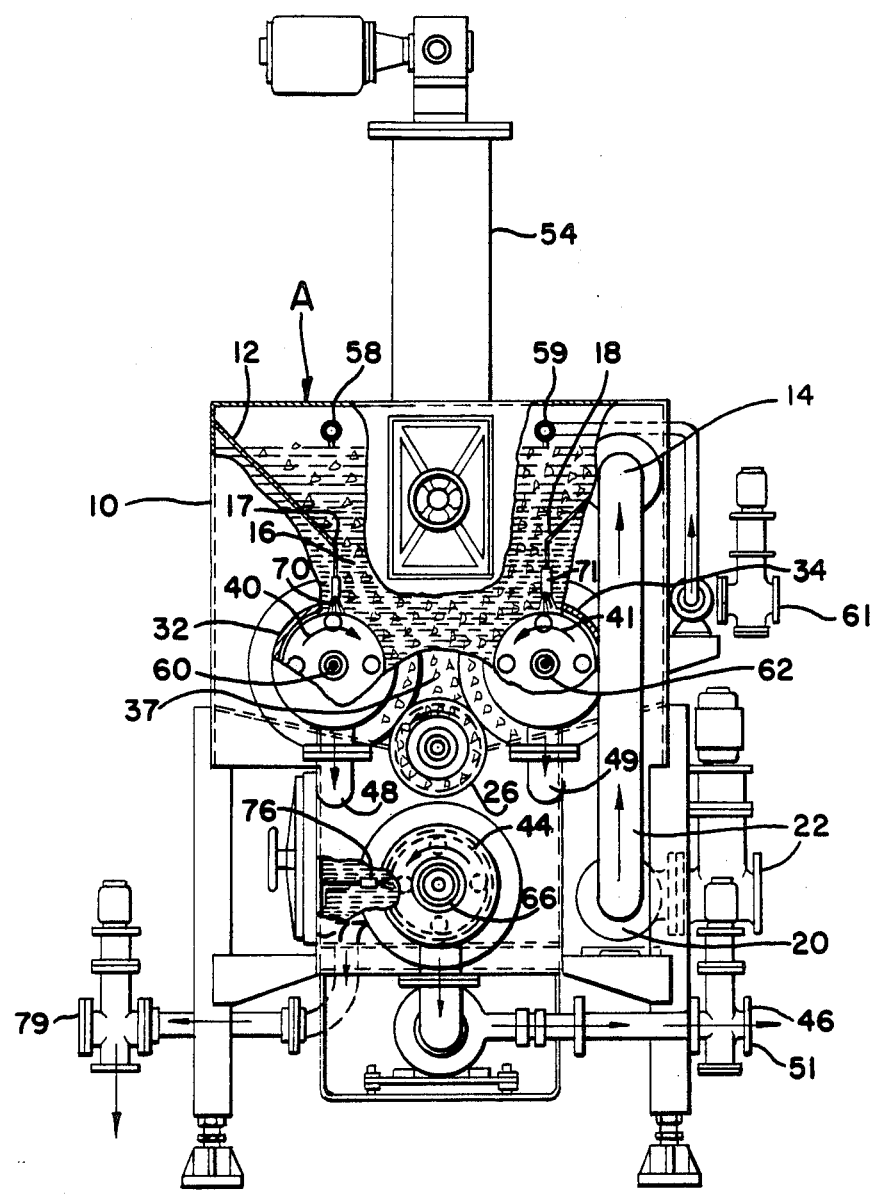
FIG. 2 is a right end view of the apparatus shown in FIG. 1.

Also provided is a pair of coacting elongated rotatable cylindrical perforated hollow drums 32 and 34 which are spaced from each other to provide a space 37 therebetween. The drums are operatively positioned in the hopper bottom opening 16 above and parallel to the helical screw conveyor 26 for receiving (from the hopper 12) caustic solution mixed with paper pieces on the outer cylindrical surfaces of the drums and directing the paper pieces into the space 37 between the drums and into the screw conveyor 26. The drums also function to receive caustic solution through the perforations 38 in the drums and thence directing such solution to the bottom of the tank 10. Drum rotating means such as the motor 39 is provided for rotating the drums about their longitudinal axes. The drums rotate in the direction of the arrows 40 and 41 shown in FIG. 2.

An elongated hollow cylindrical screen type filter 44 is disposed at the bottom of the tank 10 for final filtering of the caustic solution and for directing the filtered solution with the pump 45 through the outlet pipe 46 to an associated storage container (not shown) exteriorly of the tank 10.

In operation, a caustic soda solution mixed with paper pieces is fed by the pump 20 and manifold means 22 into the hopper 12 and thence discharged by gravity onto the continuously revolving rotating drums 32, 34, which feed the paper pieces on the outer drum surfaces into the conveyor 26 and thence to the exterior of the tank. The caustic soda solution flows through the perforations 38 in the drums and thence through the drum end openings or pipes 48, 49, to the bottom of the tank 10 and thence through the cylindrical filter 44 for final filtering and thence out the outlet 51 to an associated storage container (not shown) exteriorly of the tank 10. The conveyor screw 26 only operates after the filtered caustic soda passes out outlet 51 and is returned to such exterior associated storage tank.

The screen-type filter 44 is preferably covered with a nylon cloth to filter the caustic solution to 125 microns.

A vertical screw conveyor 54 is operatively secured to the discharge end 55 of the horizontal conveyor 26 for transporting the paper pieces 56 (in the form of a mash) from the conveyor 26 up above the apparatus A and onto an associated conveyor chute 57.

Overhead flushing of the hopper 12 is provided by the pipes 58 and 59 which are supplied with fresh water by the fresh water flushing supply manifold 61. The pipes 58, 59 have radial apertures 63 to effect such flushing.

The drums 32, 34 have back-flushing means secured thereto in the form of spray flushing pipes 60, 62, extending axially of each drum, respectively, for selectively flush cleaning the interiors thereof.

Also, the cylindrical screen-type filter 44 has back-flushing means secured thereto in the form of the pipe 66 for selectively flushing out the filter 44 from the interior thereof. The pipes 60, 62, 66 have radial apertures 52, 53 to effect such flushing.

Also provided are brushes 70, 71 secured to the bottom hopper edges 17, 18, respectively, and extending downwardly therefrom which operatively contact the drums to clean the outer surfaces thereof and forestall clogging of the drum perforations 38. Additionally, a brush 76 is secured to a bottom wall 77 of the tank, interiorly thereof, and operatively contacting the filter 44 to clean the exterior cylindrical surface thereof.

The cylinder filter 44 and the drums 32, 34, have their cylindrical peripheries formed of perforated stainless steel screens for optimum durability.

A tank drain outlet manifold 79 is provided for draining out the tank 10 for cleaning purposes.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

What is claimed is:

1. A continuously operable apparatus for separation loose paper pieces from a solution of caustic soda comprising: a tank, an elongated solid plate hopper having an inlet and operatively disposed at the top of the tank interiorly thereof for receiving through the inlet a caustic solution mixed with paper pieces and having an elongated converged bottom opening defined in part by two spaced parallel bottom hopper edges positioned intermediate the top and bottom of the tank, perforated overhead flushing pipes disposed at the top of said hopper for cleaning the hopper, pump and manifold means for directing caustic solution mixed with paper pieces into said hopper, an elongated helical horizontal screw conveyor operatively disposed below and spaced from the hopper bottom opening in substantially parallel spaced relation thereto for feeding paper pieces to the tank exterior, a vertical screw conveyor operatively secured to the discharge of said elongated helical screw conveyor for transportion the paper pieces in the form of a mash from the elongated helical screw conveyor up above the apparatus and onto an associated conveyor chute, a conveyor drive motor for driving the helical screw conveyor when desired, a pair of coacting elongated rotatable cylindrical perforated hollow drums spaced from each other to provide a space therebetween and operatively positioned in the hopper bottom opening above and substantially parallel to said helical screw conveyor for receiving from the hopper caustic solution mixed with paper pieces on the outer cylindrical surfaces of the drums and directing the paper pieces into the space between the drums and into the screw conveyor and for receiving caustic solution through the perforations in the drums and directing the solution to the bottom of the tank, a drum rotating motor for rotating the drums about their longitudinal axes, said drums each coactingly rotating in a direction to channel the paper pieces into the space between the drums, said drums having back-flushing means secured thereto to selectively flush out the drums from the interiors thereof, each of said drums having manifold piping secured to at least one of the ends thereof for feeding caustic solution from the drum interiors to the bottom of the tank, said drums having cylindrical peripheries of perforated stainless steel screens, said hopper having brushes secured to the bottom hopper edges and extending downwardly therefrom and operatively contacting said drum to clean the outer surfaces of the drums and forestall clogging of the drum perforations, an elongated hollow cylindrical screen-type filter having an outlet pipe and disposed at the bottom of the tank for final filtering of the caustic solution, a filter pump for directing the filtered solution from the outlet pipe to an associated storage container exteriorly of the tank, said cylindrical screen-type filter having a cylindrical periphery of perforated stainless steel screen, said cylindrical screen-type filter being covered with a nylon cloth to filter the caustic solution to 125 microns, said cylindrical screen-type filter having back-flushing means secured thereto for selectively flushing out the filter from the interior thereof, a brush secured to a bottom wall of the tank interiorly thereof and operatively contacting said filter to clean the exterior surface thereof, spray flushing pipes extending axially of each drum for flush cleaning the same, a tank drain outlet manifold secured to the bottom of said tank to drain the tank for cleaning purposes, and a pressurized liquid supply means communicating with each pipe, whereby a caustic soda solution mixed with paper pieces is fed by the pump and manifold means into the hopper and thence discharged by gravity onto the rotating drums which feed the paper pieces on the outer drum surfaces into the horizontal conveyor and thence to the exterior of the tank via the vertical conveyor and whereby the caustic soda solution flows through the perforations in the drums and thence to the bottom of the tank and through the cylindrical filter for final filtering and thence to an associated storage container exteriorly of the tank.

* * * * *